(12) United States Patent
Engberg et al.

(10) Patent No.: US 9,454,671 B2
(45) Date of Patent: Sep. 27, 2016

(54) SELECTIVE DATA TRANSFORMATION AND ACCESS FOR SECURE CLOUD ANALYTICS

(71) Applicant: Evernote Corporation, Redwood City, CA (US)

(72) Inventors: David Engberg, San Francisco, CA (US); Phil Constantinou, San Francisco, CA (US)

(73) Assignee: Evernote Corporation, Redwood City, CA (US)

( * ) Notice: Subject to any disclaimer, the term of this patent is extended or adjusted under 35 U.S.C. 154(b) by 226 days.

(21) Appl. No.: 14/276,350

(22) Filed: May 13, 2014

(65) Prior Publication Data

US 2015/0012565 A1 Jan. 8, 2015

Related U.S. Application Data

(60) Provisional application No. 61/843,131, filed on Jul. 5, 2013.

(51) Int. Cl.
*G06F 17/30* (2006.01)
*G06F 21/62* (2013.01)

(52) U.S. Cl.
CPC ..... *G06F 21/6218* (2013.01); *G06F 17/30557* (2013.01)

(58) Field of Classification Search
CPC .............. G06F 17/30557; G06F 21/6218
See application file for complete search history.

(56) References Cited

U.S. PATENT DOCUMENTS

| | | | | |
|---|---|---|---|---|
| 8,762,709 B2* | 6/2014 | Greer | ...................... | H04L 63/02 713/171 |
| 8,805,951 B1* | 8/2014 | Faibish | ................. | G06F 9/5072 718/1 |
| 2001/0042002 A1* | 11/2001 | Koopersmith | ......... | G06Q 30/02 705/26.3 |
| 2011/0113096 A1 | 5/2011 | Long et al. | | |
| 2011/0202881 A1 | 8/2011 | Singh et al. | | |
| 2011/0307331 A1 | 12/2011 | Richard et al. | | |
| 2012/0297184 A1* | 11/2012 | Greer | ...................... | H04L 63/02 713/155 |
| 2014/0006244 A1* | 1/2014 | Crowley | ................ | G06Q 40/04 705/37 |

FOREIGN PATENT DOCUMENTS

WO    WO 00/075842 A2    12/2000

* cited by examiner

*Primary Examiner* — Vincent Boccio
(74) *Attorney, Agent, or Firm* — Muirhead and Saturnelli, LLC

(57) ABSTRACT

Providing analytics information from a cloud service includes maintaining an analytics database that is separate from data and servers accessed by users of the cloud service, selectively pushing information from the cloud service to the analytics database, where data and servers accessed by users of the cloud service are inaccessible for direct access by the analytics database, and allowing users limited access to the analytics database, where users of the analytics information that are accessing the analytics database are restricted from accessing data and servers of the cloud service. The analytics database may include a first database of adapted database records and a second database of dynamic logs of service related events. The adapted database records may be initially formed using the data and servers accessed by users of the cloud service prior to being pushed to the analytics database.

16 Claims, 5 Drawing Sheets

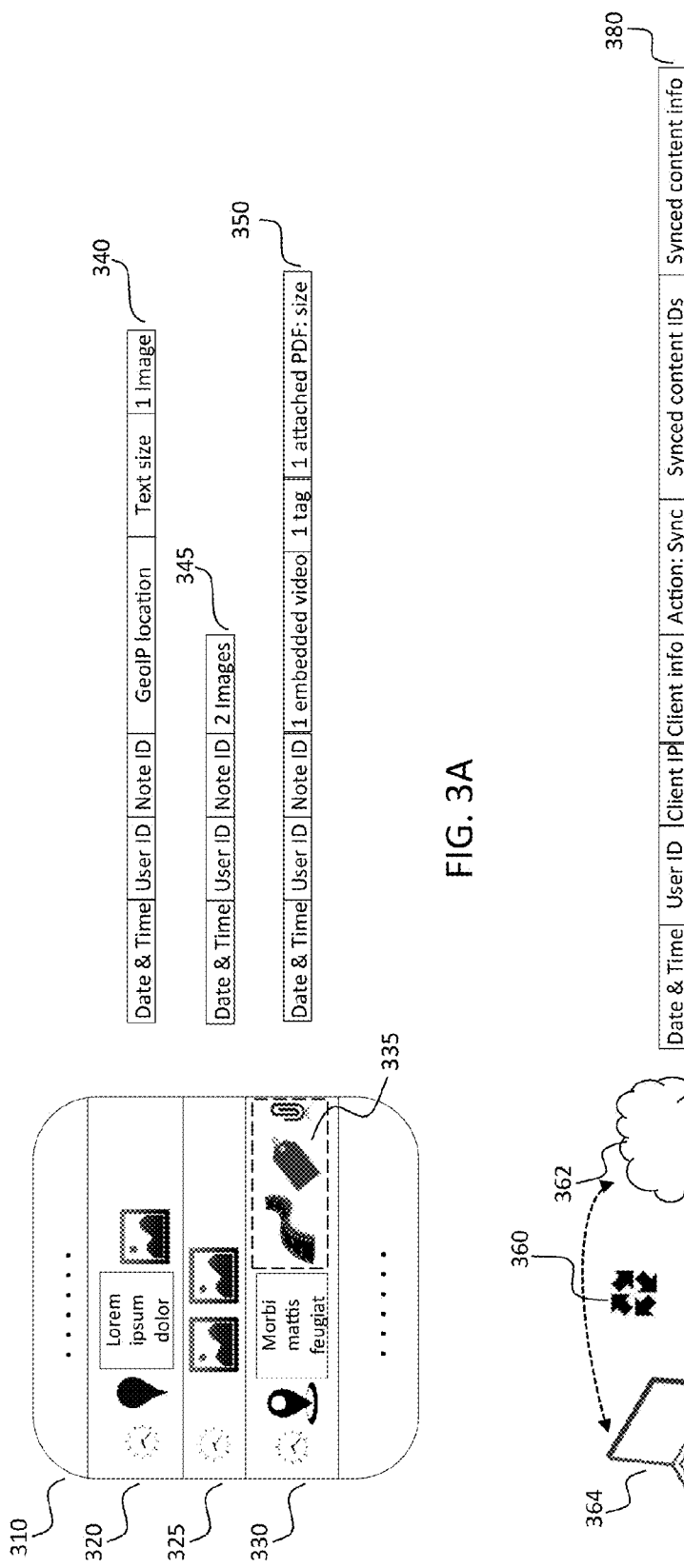
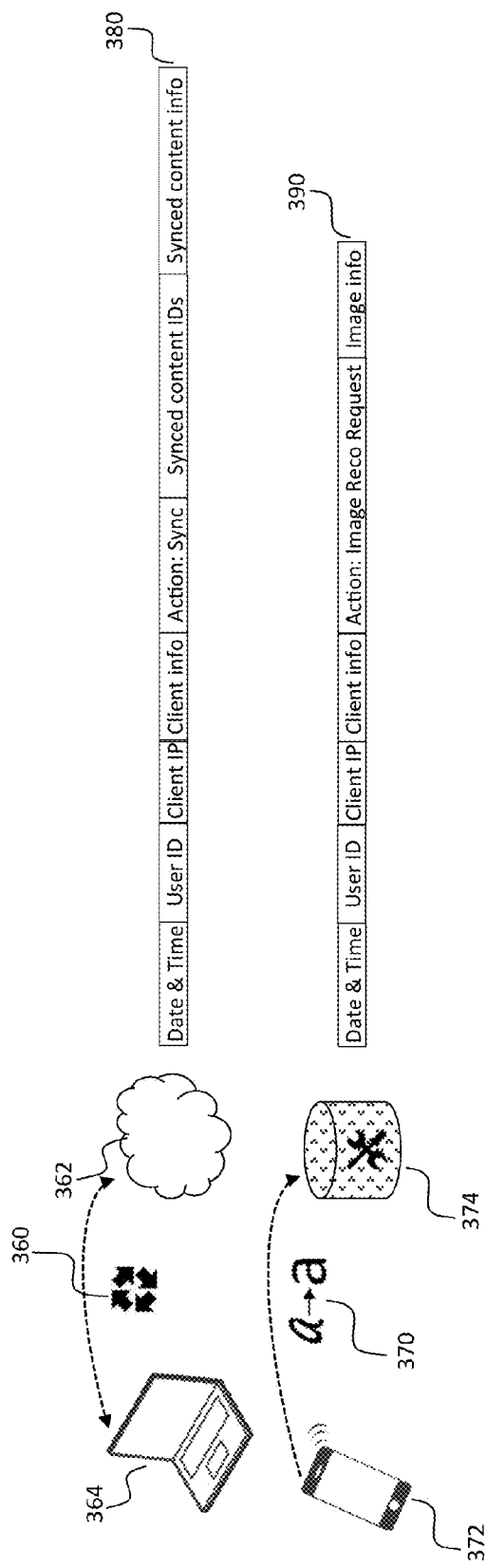
FIG. 3A
FIG. 3B

SELECTIVE DATA TRANSFORMATION AND ACCESS FOR SECURE CLOUD ANALYTICS

CROSS-REFERENCE TO RELATED APPLICATIONS

This application claims priority to U.S. Prov. App. No. 61/843,131, filed Jul. 5, 2013, and entitled "SELECTIVE DATA TRANSFORMATION AND ACCESS FOR SECURE CLOUD ANALYTICS," which is incorporated herein by reference.

TECHNICAL FIELD

This application is directed to the field of computer network architecture, and more particularly to the field of creation and access of secure data analytics for cloud services.

BACKGROUND OF THE INVENTION

In 2013, public cloud services have generated over $40B in revenue, which is expected to grow, according to market estimates, to $107B per year by 2017. Just the three largest cloud service vendors: Salesforce, Amazon Web Services, and Akamai derive over $6B in annual revenue from their service offerings. By the year 2017, cloud data analytics will make, by some estimates, dozens of billions dollars in revenue. Access to extensive analytic reports on every aspect of a cloud service functioning and its interaction with customers, other services, software and hardware are useful for the success of such services. Different types of statistics and associated data are distributed between engineering, quality assurance, operations, marketing, business teams and other departments across a service vendor organization. Additionally, business and channel partners, investors, auditors, enterprise and individual customers and, increasingly, a general public are gaining access to relevant portions of service analytics for the mutual benefits of all parties.

Broadening availability of cloud service analytics to various audiences with different positions with respect to the vendor business, diverse degrees of access to the data and dissimilar credentials are stimulating data security considerations with respect to collection, processing and presenting of analytic data and reports. In particular, a direct exposure to the analytics system and its data storage of highly sensitive and secure data stored in principal databases and file repositories of a cloud service may bring an increased risk of massive data breaches. Recent high-profile intrusions suffered by Twitter, Facebook, Apple and other key Internet players have demonstrated new malicious strategies and increased sophistication of online attacks, and growing engineering and IT potential of attackers, which cannot be ignored by architects and developers of analytics systems.

Due to diversified access to analytics data and reports, collecting real-time information from a cloud service by querying main databases and file repositories of the service for inline data analytics may be highly undesirable from the security standpoint. There may be additional channels for penetrating the service with harmful code that may eventually expose all or significant amounts of sensitive customer data stored with the service. Key reasons for such increased risks may include an overall lengthening of the security perimeter, which, in case of direct inline queries, has to include both the main data servers of the cloud service and the analytics system; and a growing access to diverse layers of the analytics data by various audiences both inside and outside of a service vendor company.

Additionally, direct polling of a cloud service for analytics purposes may not satisfy some of the needs of an advanced analytics system for many important categories of cloud services. These services include popular cross-platform personal and business centric content management systems and other productivity cloud services, such as the Evernote Service developed by Evernote Corporation of Redwood City, Calif. In addition, with many millions of users accessing a popular cloud service daily from dozens of platforms, such as Macintosh and Windows desktops, iPhones and iPads, Android, Windows, Blackberry, and other phones, Web browsers, etc., changes in service's databases may occur many times each millisecond and not all of the changes may be visible to direct queries. For example, data deletions, after emptying system trash bins or logging out of the service, may disappear from the system, which keeps the new data and may purge the old data. Other transactions, such as requests for advanced image recognition, represent deferred system activities that can be consistently measured over a certain period of time and may escape direct querying of a service's databases. Therefore, special dynamic mechanisms and logic may be needed to keep track of all system events and customer interactions with a cloud service in order to deliver useful information to the analytics system.

Accordingly, it is desirable to develop secure and efficient methods and processes for building data sets and access procedures for analytics systems associated with cloud services.

SUMMARY OF THE INVENTION

According to the system described herein, providing analytics information from a cloud service includes maintaining an analytics database that is separate from data and servers accessed by users of the cloud service, selectively pushing information from the cloud service to the analytics database, where data and servers accessed by users of the cloud service are inaccessible for direct access by the analytics database, and allowing users limited access to the analytics database, where users of the analytics information that are accessing the analytics database are restricted from accessing data and servers of the cloud service. The analytics database may include a first database of adapted database records and a second database of dynamic logs of service related events. The service related events may include data corresponding to synchronization, clipping from web pages, clipping from documents, emailing, typing, drawing, data formatting and deletion, storage optimization, image processing, image recognition, image indexing, other activities performed on servers of the cloud service and interactions with data capturing tools of a service, content sharing via email and other means, and/or data and activity exchange with third party software integrated with the cloud service platform. The adapted database records may be initially formed using the data and servers accessed by users of the cloud service prior to being pushed to the analytics database. The adapted database records may include statistical and linguistic analysis of the textual information in data accessed by users of the cloud service and keywords and/or n-grams of important words and frequencies thereof. Sensitive information may be filtered out prior to being pushed to the analytics database. The sensitive information may include user names and passwords. At least some content entered by users of the cloud service may be filtered out prior to being pushed to the analytics database. A summary of content that is filtered out may be pushed to the analytics database. Different groups of the users of the analytics information may be provided with different levels of access to the analytics database that allow access to different subsets of the analytics database.

According further to the system described herein, computer software, provided in a non-transitory computer-readable medium, provides analytics information from a cloud service. The software includes executable code that maintains an analytics database that is separate from data and servers accessed by users of the cloud service, executable code that selectively pushes information from the cloud service to the analytics database, where data and servers accessed by users of the cloud service are inaccessible for direct access by the analytics database, and executable code that allows users limited access to the analytics database, where users of the analytics information that are accessing the analytics database are restricted from accessing data and servers of the cloud service. The analytics database may include a first database of adapted database records and a second database of dynamic logs of service related events. The service related events may include data corresponding to synchronization, clipping from web pages, clipping from documents, emailing, typing, drawing, data formatting and deletion, storage optimization, image processing, image recognition, image indexing, other activities performed on servers of the cloud service and interactions with data capturing tools of a service, content sharing via email and other means, and/or data and activity exchange with third party software integrated with the cloud service platform. The adapted database records may be initially formed using the data and servers accessed by users of the cloud service prior to being pushed to the analytics database. The adapted database records may include statistical and linguistic analysis of the textual information in data accessed by users of the cloud service and keywords and/or n-grams of important words and frequencies thereof. Sensitive information may be filtered out prior to being pushed to the analytics database. The sensitive information may include user names and passwords. At least some content entered by users of the cloud service may be filtered out prior to being pushed to the analytics database. A summary of content that is filtered out may be pushed to the analytics database. Different groups of the users of the analytics information may be provided with different levels of access to the analytics database that allow access to different subsets of the analytics database.

Both types of data may be pushed by the cloud service to the standalone analytics databases; note that the analytics system does not have direct polling access to the databases of the main service. Sensitive data such as user passwords or full content of user documents and notes are filtered out and not provided to the adapted database records and may not appear in the analytics area. For the portion of sensitive data that is allowed through a barrier between the main service and the analytics system, such as customer or end user emails necessary for conducting marketing campaigns, access to the analytics data that includes such sensitive information may be further stratified by categories of users of the analytics system. For example, access to portions of the analytics data containing user emails may be limited to a marketing team responsible for direct mailing and user communications and to a customer support team. In addition to such access limitations, further security measures with respect to personnel and hardware/software systems used to access sensitive portions of data within the analytics databases may be taken.

In addition to guarding personal information of users, such as login credentials and emails, adapted database records for productivity cloud services may also protect content entered by users. Thus, adapted database records may include a summary of the content without including the content per se. At any given moment, such records may represent a snapshot of user content built with a maximum possible de-personalization of the data. For example, instead of using note text in adapted database records, main characteristics of the text, such as length of the text in words and symbols, average word length, etc., may be transferred. Additionally, statistical and linguistic analysis of the note text may be performed and most important keywords or n-grams with their frequencies may be included in adapted database records. Similarly, embedded images may be replaced by key characteristics of the images, such as dimensions, size, compression type, color depth, palette, etc.

Dynamic logs of service related events for productivity cloud services may store system events with high granularity. Log records may include a majority of interactions between the cloud service, on the one hand, and mobile and desktop client software that accesses the cloud service, on the other hand, as well as interactions with application servers, integrated third party software, other cloud services, content distribution, sharing, publishing, etc. Information that is logged may include synchronization, methods of data addition, such as clipping from web pages or documents, emailing, typing in, drawing, etc., data formatting and deletion, storage optimization, image processing, recognition and indexing, and other activities performed on servers of a main cloud service and on dedicated application servers. The logged information may also include interactions with data capturing tools of a service (for example, web, document and email clipping, screen snapshotting software, etc.), content sharing via email and other means, data and activity exchange with third party software integrated with the cloud service platform via published APIs, etc.

Analytics databases may keep snapshots of content of a cloud service and activities for a certain period of time, archiving the snapshots afterwards. The structure of analytics databases may be published within an organization and may be owned by the IT team.

Depending on reporting requirements, data refresh cycles for the analytics database may vary from a periodic push of previously accumulated data, such as daily updates, to continuous nearly real-time submissions where data is not accumulated on the cloud service side but is instantly formed as changes occur and is pushed through the barrier immediately. Alternatively, special requests for enhanced analytics data sets may be served by one-time special projects conducted by IT teams in cooperation with interested parties. Certain analytic reports requiring deep access to user data, such as statistical and semantic analysis of texts entered by users, user travel and other personal patterns and information, etc., may be generated directly within the cloud service from time to time, without deploying the data within the analytics area and with additional security and access restrictions.

Access to different portion of the analytics area may be offered to diverse categories of users with certain access restrictions, in order to limit an exposure of potentially sensitive data to special projects. An example of such a special project and team may be a targeted email marketing campaign and a direct mailing (marketing) team that may have access both to user emails and to individual usage data, as necessary for targeting the campaign. Such access may be necessary to track user behavior and customize target lists and respective messages based, for instance, on platforms of owned mobile devices and on usage patterns for such devices. Additional security measures may be applied to equipment, software and data access channels used by special project teams.

BRIEF DESCRIPTION OF THE DRAWINGS

Embodiments of the system described herein will now be explained in more detail in accordance with the figures of the drawings, which are briefly described as follows.

FIGS. 3A-3B are schematic illustrations of adapted database records and dynamic logs of service related events, according to embodiments of the system described herein.

DETAILED DESCRIPTION OF VARIOUS EMBODIMENTS

The system described herein provides a mechanism for deployment and utilization of secure analytics systems associated with cloud services which is based on distilling new content, documenting service related events, and pushing both type of information to a separate set of analytics databases that may have access that is stratified by different categories of users and additional security protection.

Figure 1:
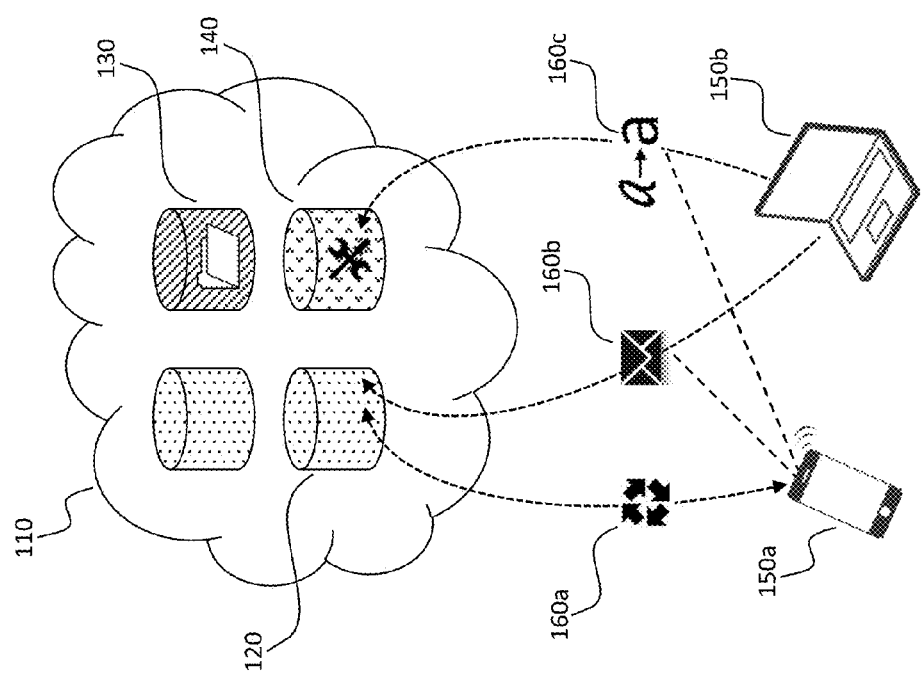
FIG. 1 is a schematic illustration of architecture of a cloud service, according to embodiments of the system described herein.

FIG. 1 is a schematic illustration 100 of architecture of a cloud service. A cloud service 110 includes three types of servers: data servers 120 for content collected and authored directly by users, such as a body of a user note in the Evernote Service and Software; file servers 130 for storing attachments, original images, document repositories and other similar content; and application servers 140 performing computationally intense technological tasks, such as image recognition and indexing, semantic pre-processing of content for natural search, etc. In other embodiments, additional types of servers may be present in a cloud service architecture, while some types of the servers 120, 130, 140 may not be used.

The cloud service 110 is accessed by users through client software running on various types of desktops and mobile devices, such as a smartphone 150a and a notebook computer 150b. There may be multiple kinds of interactions between the cloud service and the client software; in FIG. 1, three types of interactions are exemplified:

Data synchronization 160a where content changes on client devices that are consolidated with a central version of a user database stored in the cloud on the data servers 120 and/or on the file servers 130 and then propagated to all client devices of the user that are connected to the cloud service.

Adding new content by sending email messages 160b to the service; such content posting may use dedicated email addresses assigned by the cloud service to registered users.

Handwriting recognition from images 160c; images may be photos, screenshots, drawings or illustrations captured from the Web or embedded into documents, etc. Such intelligent image processing may be performed by the application servers 140.

Figure 2:
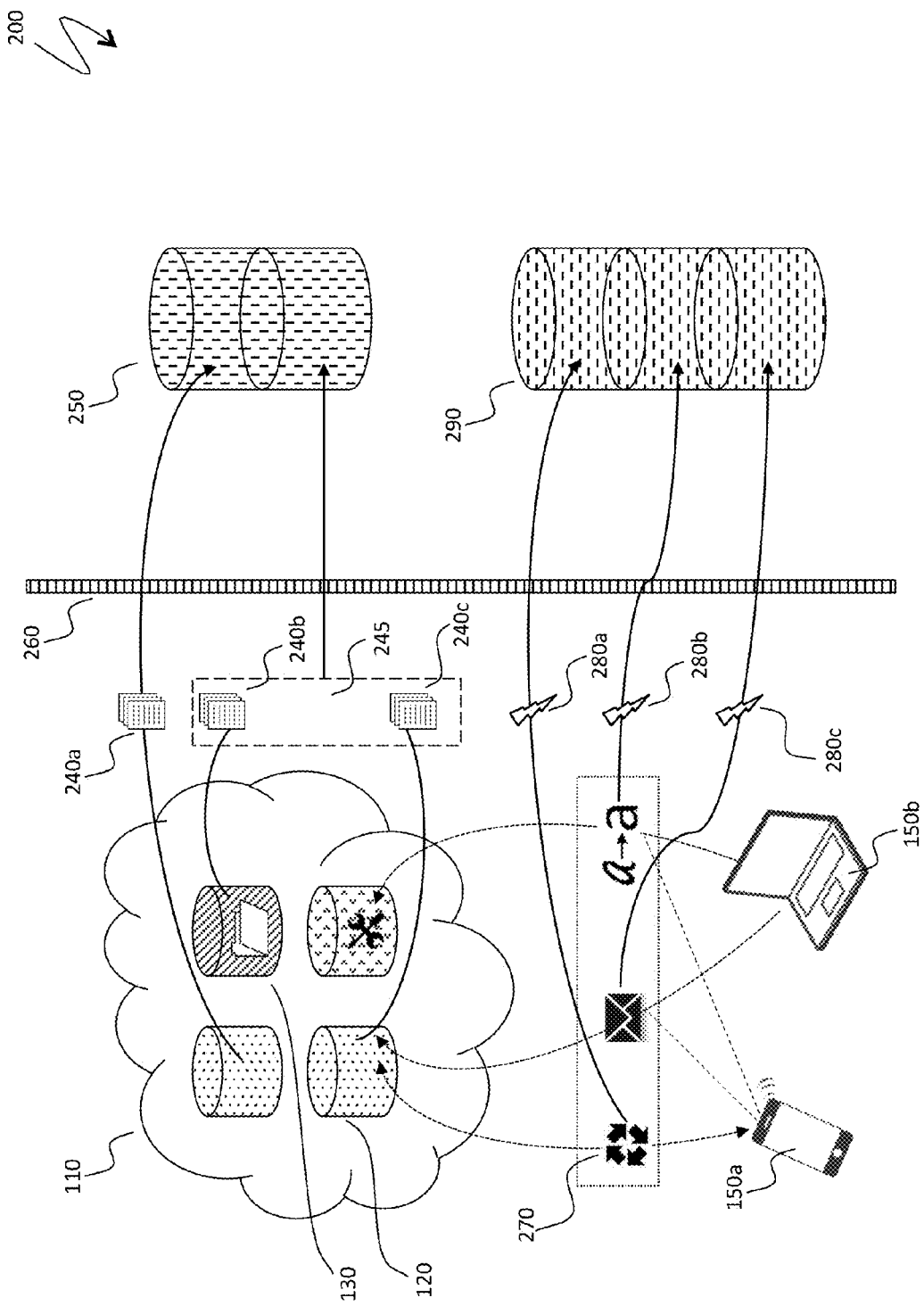
FIG. 2 schematically illustrates data flow between a cloud service and analytics databases, according to embodiments of the system described herein.

FIG. 2 is a schematic illustration 200 of data flow between the cloud service 110 and analytics databases 250, 290. After a content stored in the cloud service 110 has been changed as a result of interactions with users or due to other circumstances (for example, search indexes produced by application servers may have been added to notes in Evernote notebooks, or external data from social networks may have been pulled into the cloud service to enhance contact information captured by users), the system builds adapted database records 240a-c to represent these content changes in the analytics system. The changed content may be on the data servers 120 or the file servers 130, discussed above. Subsequently, the system pushes the adapted database records 240a-c to the analytics database 250, following an update schedule, as explained elsewhere herein. In FIG. 2, an adapted database record 240a is pushed into the analytics database 250 individually, while the records 240b-c are accumulated into a temporary log 245, which is subsequently pushed into the analytics database 250 and then deleted. The analytics database 250 is located within a different security perimeter, as illustrated by a security barrier 260. This means that a potential security breach of the analytics databases 250, 290 does not directly affect data of the cloud service 110.

In a similar way, new events 270 occurring in the cloud service 110 (explained elsewhere herein), cause the system to prepare records of system related events 280a-c, potentially add the events 280a-c to dynamic event logs and periodically push the logs or the events 280a-c to the analytics database 290 through the security barrier 260. In FIG. 2, each of the three event records 280a-c is sent to the analytics database 290 individually. Note that, in some embodiments, the separate analytics databases 250, 290 may be combined into a single database.

FIGS. 3A-3B are schematic illustrations of adapted database records and dynamic logs of service related events. A content collection 310 in FIG. 3A, such as a notebook in the Evernote cloud service, contains two newly created notes 320, 325 and modifications (additions) to an existing note 330 shown in a dashed rectangle 335. In response to content changes, the system creates three adapted database records 340, 345, 350, which may be accumulated into a temporary log or immediately sent to the analytics storage. A common part of all three adapted database records is date-and-time information, a unique User ID and a unique Note ID in the cloud service that may be subsequently used for verifying correctness of data collection and, if necessary and permitted, for associating analytics materials with more precise details of the original content. The remaining portions of the adapted data records 340, 345, 350 are variable. In the example of FIG. 3A, text size is considered a representative parameter of text and is therefore serving as a descriptor of a text portion of the note 320. The record 340 has a location field containing a GeoIP location obtained and recorded for the note 320. As for images, in the example of FIG. 3A, only the presence of images is identified for analytics purpose; correspondingly, the last fields in the records 340, 345 offer a count of embedded images in the corresponding notes. The adapted database record 350 includes descriptive fields corresponding to the changes 335 to the note 330 (count of embedded videos, added tags, and attached PDFs, with an additional information on the size of the attachment(s)).

In FIG. 3B, two service related events 360, 370 are represented by corresponding records 380, 390. The first event 360 is a synchronization session between client software on a notebook 364 and a cloud service 362. The second event 370 is an image recognition request sent by mobile client software on a smartphone 372 to an application server 374, which may be related, for example, to a new photo of a whiteboard taken with the smartphone. Both event records 380, 390 may have common fields containing a date-and-time stamp and a User ID (similar to the case of adapted database records), a Client IP identifying a network location of the transmitting client software, and Client info, such as type, platform and version, for example, "iPhone 5S, iOS 7.1.1, Evernote 7.3.3". The Action field may include an event description, such as "Sync" in the record 380 or "Image Reco Request" in the record 390. Additional fields in the example of FIG. 3B include unique identifiers of synchronized content, such as notes and resources in Evernote, other information on synchronized content for the record 380, image information for the record 390, etc.

Figure 4:
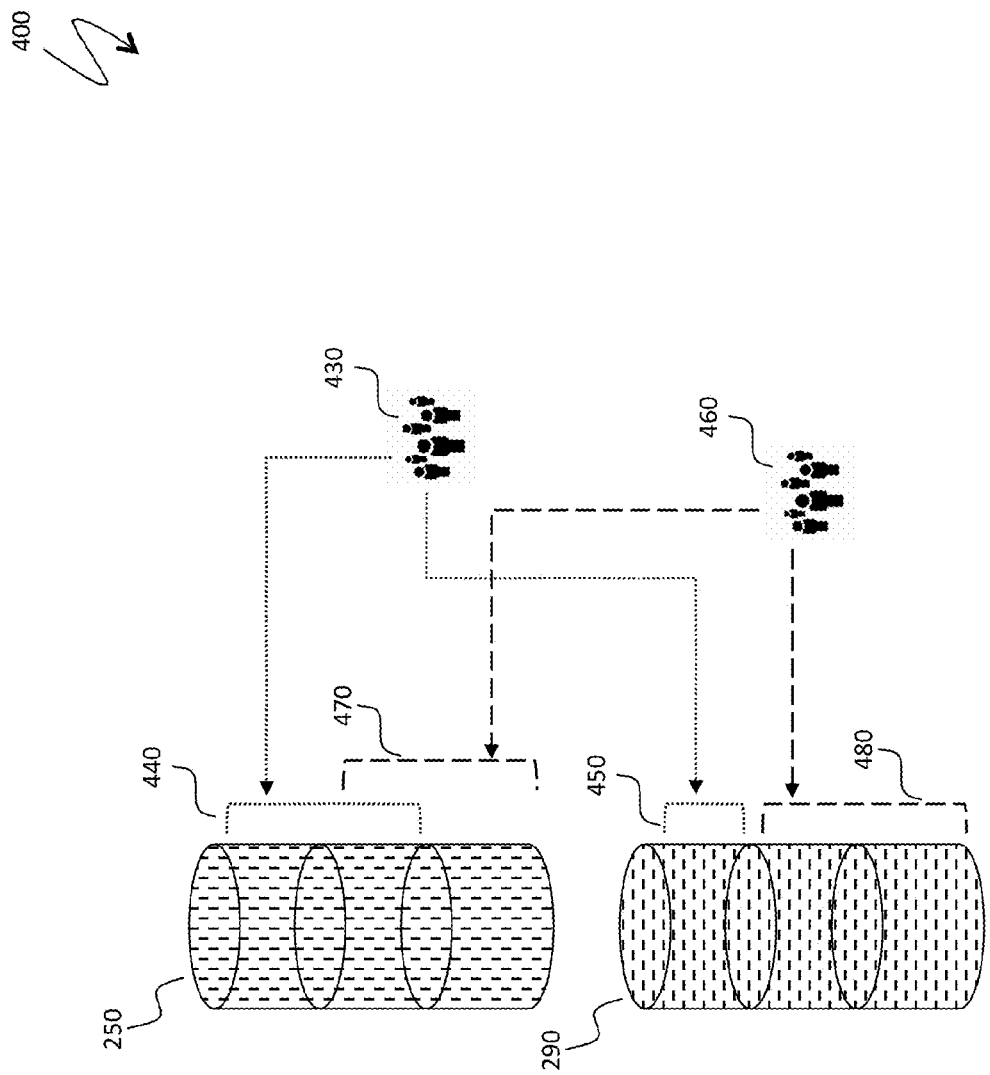
FIG. 4 is a schematic illustration of stratified user access to analytics databases, according to embodiments of the system described herein.

FIG. 4 is a schematic illustration 400 of stratified user access to the analytic databases 250, 290, which include adapted database records and service related event records generated by the cloud service and pushed through the security barrier 260, as described above. Two groups of users have access to the analytic databases 250, 290. A first group 430 may access a portion 440 of the analytics database 250 and a portion 450 of the analytics database 290. Another group of users 460 may access a different portion 470 of the analytics database 250 and a different portion 480 of the analytics database 290. If one of the portions 440, 450, 470, 480 contains sensitive information—for example, assuming that parts of the portion 440 that do not overlap with the portion 470 contain customer emails—then additional security measures may be applied to the group of users 430. For example, under the previous assumption, the group 430 may be required to use a two-factor authentication to access the portion 440 and may be automatically logged out from the system after a very short period of inactivity. Hardware locks may also be used on the computers of the group 430.

Figure 5:
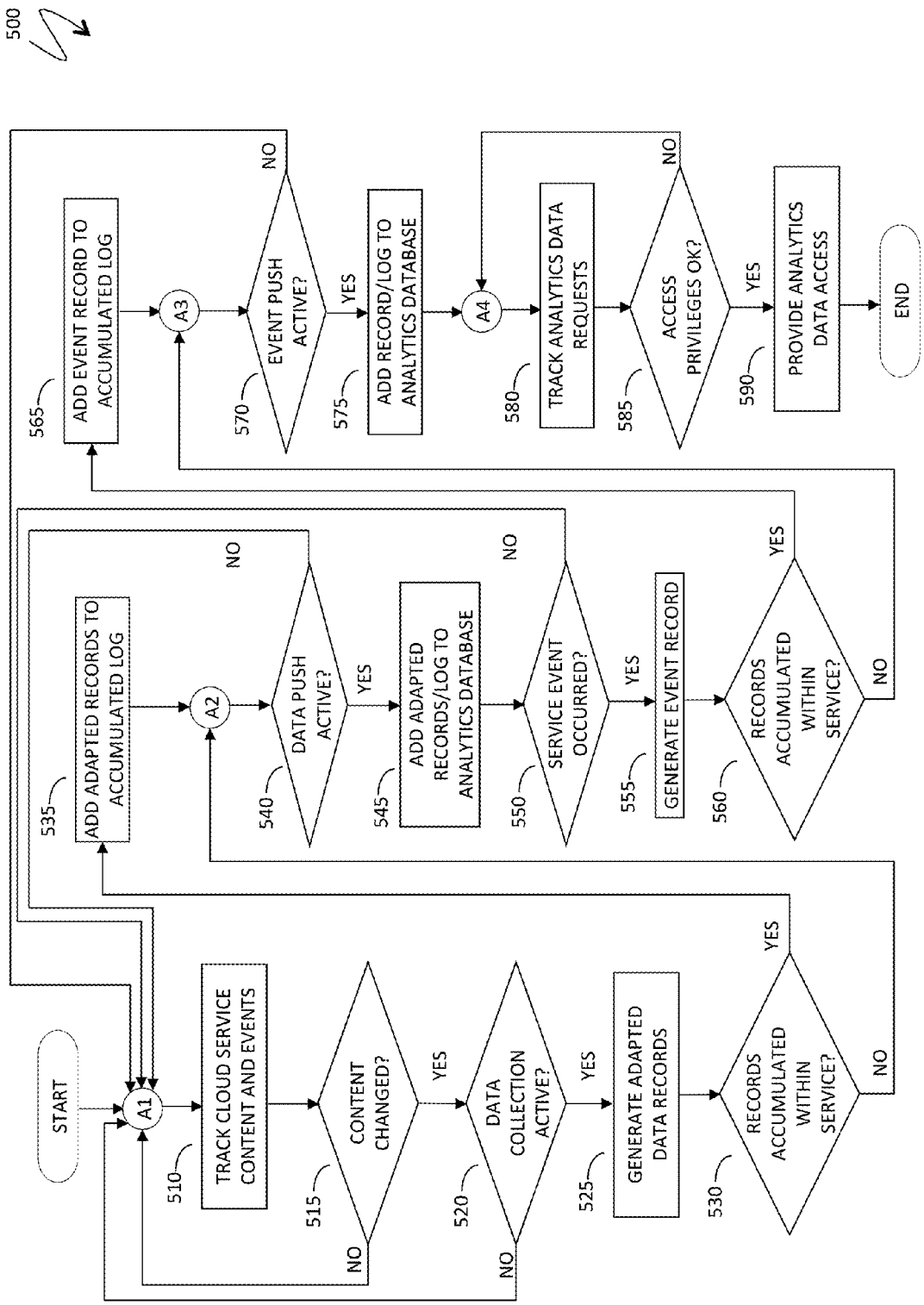
FIG. 5 is a system flow diagram illustrating operation of the system, according to embodiments of the system described herein.

Referring to FIG. 5, a flow diagram 500 illustrates functioning of the system described herein. Processing starts at a step 510 where the system tracks content and events of the cloud service. After the step 510, processing proceeds to a test step 515, where it is determined whether the content has changed. If not, then control returns back to the step 510 for further tracking; if it is determined at the step 515 that the content has changed, then processing proceeds to a test step 520, where it is determined whether the system is in an active data collection mode. It should be noted that generation of adapted database records may be performed in periodic sessions and the collection process may be inactive between the sessions.

If it is determined at the test step 520 that data collection is inactive, then control returns back to the step 510 for further tracking; otherwise, processing proceeds to a step 525 where adapted data records are generated. After the step 525, processing proceeds to a test step 530, where it is determined whether the generated records are accumulated within the cloud service, such as in temporary logs (explained in conjunction with the item 245 in FIG. 2). If so, processing proceeds to a step 535 where adapted database records are added to an accumulated log. After the step 535, processing proceeds to a test step 540, which can also be reached directly from a test step 530 if it turns out that adapted database records are not accumulated within the cloud service.

At the test step 540, it is determined whether a data push mode that transfers individual adapted database records or logs of such records to the analytics data storage is active. If not, processing proceeds back to the step 510, discussed above; otherwise, processing proceeds to a step 545 where adapted data records or logs are pushed to the analytics database. After the step 545, processing proceeds to a test step 550, where it is determined whether a service related event has occurred. If not, processing proceeds back to the step 510 for further tracking; otherwise, processing proceeds to a step 555 where a record for a service related event is generated, as explained and illustrated elsewhere herein (see, for example, FIG. 2B and corresponding text). After the step 555, processing proceeds to a test step 560, where it is determined whether service related event records are accumulated in temporary logs within the cloud service (analogously to the step 530 discussed above). If so, processing proceeds to a step 565, where the newly created record of a service related event is added to an accumulated log. After the step 565, processing proceeds to a test step 570, which can also be reached from a test step 560 if it turns out that records of service related events are not accumulated within the cloud service.

At the test step 570, it is determined whether an event push mode that transfers individual records or logs of records of service related events to the analytics data storage is active. If not, processing proceeds back to the step 510; otherwise, processing proceeds to a step 575 where a new record or a log of records of cloud service related events is added to the analytics database. After the step 575, processing proceeds to a step 580 where the system tracks analytics data requests from its users and user groups. After the step 580, processing proceeds to a test step 585 where it is determined whether access privileges and credentials of users requesting access to the analytics system are correct. If not, processing proceeds back to the step 580 for continued tracking of analytics data access requests; otherwise, processing proceeds to a step 590 where the system provides analytics data access to verified users. Following the step 590, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors, including one or more processors of a server or a desktop computer. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing analytics information from a cloud service, comprising:

maintaining an analytics database that is separate from data and servers accessed by users of the cloud service;

forming adapted database records by filtering out sensitive information from the data on the servers of the cloud service;

selectively pushing the adapted database records from the cloud service to the analytics database, wherein data and servers accessed by users of the cloud service are inaccessible for direct access by the analytics database; and allowing users limited access to the analytics database, wherein users of the analytics information that are accessing the analytics database are restricted from accessing data and servers of the cloud service to prevent access to the sensitive information.

2. A method, according to claim 1, wherein the analytics database includes a first database of the adapted database records and a second database of dynamic logs of service related events.

3. A method, according to claim 2, wherein the service related events include data corresponding to at least one of: synchronization, clipping from web pages, clipping from documents, emailing, typing, drawing, data formatting and deletion, storage optimization, image processing, image recognition, image indexing, other activities performed on servers of the cloud service and interactions with data capturing tools of a service, content sharing via email and other means, and data and activity exchange with third party software integrated with the cloud service platform.

4. A method, according to claim 1, wherein the adapted database records include statistical and linguistic analysis of the textual information in data accessed by users of the cloud service and at least one of: keywords or n-grams of important words and frequencies thereof.

5. A method, according to claim 1, wherein the sensitive information includes user names and passwords.

6. A method, according to claim 1, wherein at least some content entered by users of the cloud service is filtered out prior to being pushed to the analytics database.

7. A method, according to claim 6, wherein a summary of content that is filtered out is pushed to the analytics database.

8. A method, according to claim 1, wherein different groups of the users of the analytics information are provided with different levels of access to the analytics database that allow access to different subsets of the analytics database.

9. Computer software, provided in a non-transitory computer-readable medium, that provides analytics information from a cloud service, the software comprising:

executable code that maintains an analytics database that is separate from data and servers accessed by users of the cloud service;

executable code that forms adapted database records by filtering out sensitive information from the data on the servers of the cloud service;

executable code that selectively pushes the adapted database records from the cloud service to the analytics database, wherein data and servers accessed by users of the cloud service are inaccessible for direct access by the analytics database; and executable code that allows users limited access to the analytics database, wherein users of the analytics information that are accessing the analytics database are restricted from accessing data and servers of the cloud service to prevent access to the sensitive information.

10. Computer software, according to claim 9, wherein the analytics database includes a first database of the adapted database records and a second database of dynamic logs of service related events.

11. Computer software, according to claim 10, wherein the service related events include data corresponding to at least one of: synchronization, clipping from web pages, clipping from documents, emailing, typing, drawing, data formatting and deletion, storage optimization, image processing, image recognition, image indexing, other activities performed on servers of the cloud service and interactions with data capturing tools of a service, content sharing via email and other means, and data and activity exchange with third party software integrated with the cloud service platform.

12. Computer software, according to claim 9, wherein the adapted database records include statistical and linguistic analysis of the textual information in data accessed by users of the cloud service and at least one of: keywords or n-grams of important words and frequencies thereof.

13. Computer software, according to claim 9, wherein the sensitive information includes user names and passwords.

14. Computer software, according to claim 9, wherein at least some content entered by users of the cloud service is filtered out prior to being pushed to the analytics database.

15. Computer software, according to claim 14, wherein a summary of content that is filtered out is pushed to the analytics database.

16. Computer software, according to claim 9, wherein different groups of the users of the analytics information are provided with different levels of access to the analytics database that allow access to different subsets of the analytics database.

* * * * *